United States Patent
Goren

(10) Patent No.: US 9,210,261 B2
(45) Date of Patent: *Dec. 8, 2015

(54) SYSTEMS AND METHODS OF TRANSFERRING USER INFORMATION TO DIFFERENT DEVICES

(71) Applicant: David Goren, Irvine, CA (US)

(72) Inventor: David Goren, Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/209,944

(22) Filed: Mar. 13, 2014

(65) Prior Publication Data

US 2014/0342774 A1 Nov. 20, 2014

Related U.S. Application Data

(63) Continuation of application No. 13/396,483, filed on Feb. 14, 2012, now Pat. No. 8,676,258.

(60) Provisional application No. 61/443,135, filed on Feb. 15, 2011.

(51) Int. Cl.
| | |
|---|---|
| *H04M 3/00* | (2006.01) |
| *H04M 3/42* | (2006.01) |
| *H04L 29/08* | (2006.01) |
| *H04W 92/18* | (2009.01) |

(52) U.S. Cl.
CPC ....... *H04M 3/42263* (2013.01); *H04L 67/1095* (2013.01); *H04W 92/18* (2013.01)

(58) Field of Classification Search
CPC ..... H04W 92/00; H04W 92/02; H04W 92/04; H04W 92/16; H04W 92/18; H04W 92/24
USPC ............................ 455/557, 556.1, 558, 426.1
See application file for complete search history.

(56) References Cited

U.S. PATENT DOCUMENTS

| | | | |
|---|---|---|---|
| 6,449,651 B1* | 9/2002 | Dorfman et al. | 709/229 |
| 7,035,619 B1* | 4/2006 | Fargano et al. | 455/406 |
| 7,088,805 B1 | 8/2006 | Moore et al. | |
| 2005/0075102 A1* | 4/2005 | Minko | 455/420 |
| 2006/0116113 A1* | 6/2006 | Gass | 455/414.4 |
| 2006/0256734 A1 | 11/2006 | Erhart et al. | |
| 2007/0016362 A1* | 1/2007 | Nelson | 701/200 |
| 2007/0049342 A1 | 3/2007 | Mayer et al. | |
| 2007/0087780 A1 | 4/2007 | Nassimi | |
| 2007/0198857 A1* | 8/2007 | Gidalov | 713/193 |
| 2007/0296559 A1 | 12/2007 | Fehr | |
| 2008/0002666 A1 | 1/2008 | Cope | |
| 2008/0208787 A1* | 8/2008 | Luchene | 706/47 |
| 2009/0076921 A1 | 3/2009 | Nelson et al. | |
| 2009/0163244 A1 | 6/2009 | Parkkinen et al. | |
| 2011/0191484 A1 | 8/2011 | Babbar et al. | |
| 2012/0023234 A1 | 1/2012 | Martin | |
| 2012/0271725 A1 | 10/2012 | Cheng | |

* cited by examiner

*Primary Examiner* — Jean Gelin
(74) *Attorney, Agent, or Firm* — Knobbe, Martens, Olson & Bear, LLP

(57) ABSTRACT

A communications system according to certain embodiments includes a mobile device and a second type of communications system, such as a landline telephone system, that share usage information. The shared information can include call logs of in-coming and out-going calls, missed calls, text messages, address book information, GPS data, internet browsing data, and the like.

18 Claims, 4 Drawing Sheets

SYSTEMS AND METHODS OF TRANSFERRING USER INFORMATION TO DIFFERENT DEVICES

CROSS-REFERENCE TO RELATED APPLICATION

Any and all applications for which a foreign or domestic priority claim is identified in the Application Data Sheet, or any correction thereto, are hereby incorporated by reference under 37 CFR 1.57.

TECHNICAL FIELD

The present disclosure relates to systems and methods of transferring user information regarding to multiple devices and more particularly to transferring call lists on a mobile phone to other devices such as desktop or landline phones.

BACKGROUND

Many of communication devices such as cellular phones, landline phones, laptop computers, desktop computers, and the like remain islands unto themselves. Users constantly re-enter favorites and preferences such as calling information into these devices because it is not currently possible transfer such information across devices.

Accordingly, the personalized use of one electronic device typically remains isolated and independent of the personalized use of other electronic devices available to the user.

SUMMARY

This disclosure describes examples of systems and methods for sharing information among different communication devices. In one embodiment of the invention, a mobile phone connects to another mobile phone, a landline phone, laptop computer or desktop computer via an electronic link. Software on the mobile phone or other the devices transfer, or synchronize, the call list on the mobile phone with the other devices. Such synchronized information can include by way of example, call logs of in-coming and out-going calls, missed calls, text messages, address book information, GPS data, internet browsing data, and the like.

For example, a first device comprises a mobile phone with a call list of in-coming and out-going calls. When a user desires to transfer the call list from the first device to a second device, software running on either the first or second devices transfers the call list from the first device to the second device.

In one embodiment, when electronically connected, either wirelessly or by wire, the first device copies or mergers the contents of its call list into a call list associated with the second device. Similarly, a recent call list in the second device can be automatically transferred or merged with the call list of the first device. This process can occur when a user is participating in an ongoing telephone call on either device or at a subsequent time. The call list on either device can therefore contain a list of recently called persons made by both devices.

In another embodiment, the call lists from both devices are transferred to or merged with a central system accessible via a network such as the Internet. Thus, a user of either device can access and use the call list by accessing the central system.

Furthermore, in one embodiment, a call received on the first device can be automatically or transferred to the second device or vice versa. This transfer function can be performed by the either device or by software on one of the devices. In conventional systems, in contrast, the user would have to hang up his mobile phone and then call his contact with a landline phone in a separate phone call to complete the call with the landline phone.

The transfer of the call list can be performed via a direct connection between the two devices or via a centralized system. For example, a software module on the first device can transfer the call list to a central server that then synchronizes the call list with the call list on the second device.

In one example, a user can select a contact from the cell phone call list or list of contacts, or highlight a number from the cell phone's "missed call" or "dialed calls" "received call" list, then press dial on the cell phone and the call will be made via the landline instead of from the cell phone. Likewise, the user can select the same lists on the user's laptop or desktop and have a desired phone number automatically called on the cell phone.

The connection between the cell phone and the landline phone can be via hard wire or via a dongle that has the necessary software or via wireless connection (if the phones are paired). Software can be embedded in the both the cell phones or may be embedded in dongles connecting the phones. In another embodiment, a dongle or other direct connection is used to connect a mobile device with a legacy phone system. The mobile device then provides automatic dialing and call handling using the call list on the mobile device.

In yet another embodiment, when the cell phone is connected to a second device via hard wire or wireless or via dongle, the cell phone can use the second device's printer resources such that a document or e-mail or page from the cell phone can be printed. Likewise, the cell phone can be directly connected to a second device via hard wire or wireless or via dongle, the printer can then print document, e-mails or pages that exist on the cell phone.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

While described primarily with respect to sharing of information among different communications devices, the techniques described herein may be equally compatible with automobile communications systems, maritime communications systems, home telephone systems, as well as other types of computing devices including desktop computers, laptops, and servers.

Figure 1:
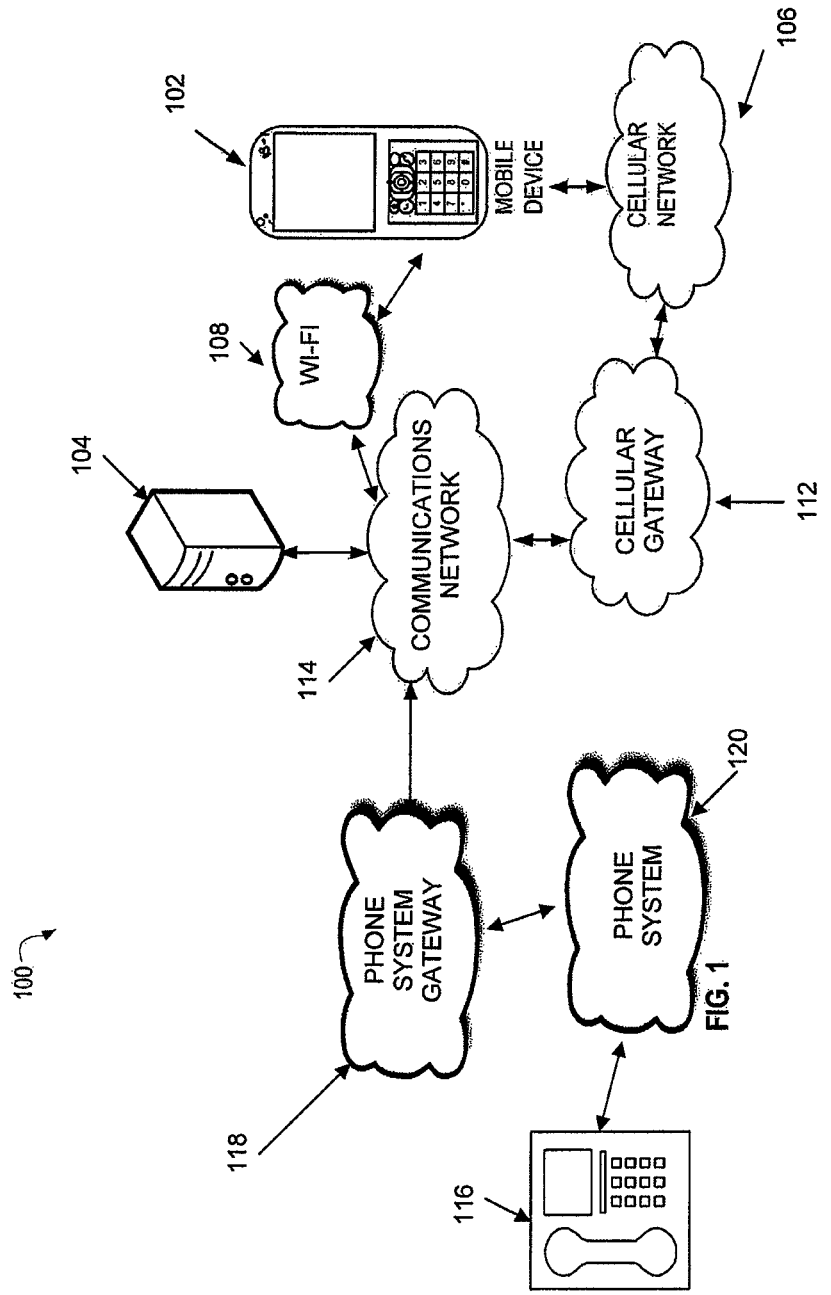
FIG. 1 illustrates an embodiment of the invention used within a communications system.

FIG. 1 illustrates an embodiment of a communications system 100 used in certain embodiments of the invention. Communications system 100 enables a mobile device 102 to provide information to server 104. Such information can include by way of example, a log of in-coming and out-going calls, missed calls, text messages, address book information, GPS data, internet browsing data, and the like. In other embodiments mobile device 102 may be a non-mobile device or a landline device having a wire connection.

In certain embodiments, mobile device 102 provides the information to server 104 via the cellular network or via other wireless protocols such as link 108 which can be a WiFi link, cable communication link, or other links employing a variety of protocols such as the internet transport protocol. When the mobile device 102 sends the information to the server 104, via the link 108, the communications network 114 relays the information to server 104.

In another embodiment, the mobile device 102 provides the information to the server 104 via other types of wireless or wired links. When using the cellular network 106, a cellular gateway 112 is responsible for routing messages between cellular network 106 and a communications network 114. In one embodiment the communications network 114 is the internet; however, in other embodiments, the communications network 114 can by any type of network that communicates with server 104 such as a wide area network (WAN), local area network (LAN), or various other types of wired or wireless networks.

In one embodiment, the server 104 receives changes made to the information on the mobile device 102. In other embodiments, the server requests the changes from the mobile device 102. These changes to the information are stored in the server 104 or some other attached storage device. The server 104 then sends these changes to phone 116.

When sending the information to phone 116, the server 104 transmits the information and/or the changes to the information to the phone 116 via a phone system gateway 118 and a phone system 120. The phone system gateway 118 is responsible for routing messages between the communications network 114 and the phone system 120. In certain embodiments, phone system 120 comprises a landline phone system such as a Public Service Telephone Network ("PSTN"). In other embodiments, phone system 120 may be another mobile communications system.

In certain embodiments, phone 116 comprises a landline phone and phone system 120 comprises a landline phone system. In other embodiments, phone 116 may be a cordless phone that is connected to a landline system. In yet other embodiments, phone 116 may be another mobile device. In other embodiments, the phone 116 or phone system 120 may be other systems such as other automobile communications systems, maritime communications systems, home entertainment systems and the like. Furthermore, the phone 116, may be a second mobile device or other types of computing devices such as desktop computers, laptop computers, personal digital assistants and the like. Hereinafter the phone 116 and phone system will be referred to both individually and collectively as the phone system 120.

In yet other embodiments, the mobile device 102 communicates directly either wirelessly or by wire with phone system 120.

The transfer of information from the mobile device 102 and the phone system 120 can be uni-directional or bi-directional, meaning that changes in one device are copied to the other device. In one implementation, copying the information is initiated periodically by server 104, such as on a scheduled basis as specified in a user-defined or administrator-defined setting. In another implementation, copying the information is initiated by server 104 when the user initiates a feature of mobile device 102 or begins to use phone system 120. Alternatively or additionally, the copying can be initiated by server 104 upon request from phone system 120 or mobile device 102. In yet another implementation, the copying is initiated by the mobile device 102 periodically, such as when information on the mobile device 102 changes. Still further, the copying is initiated by the phone 116 or the phone system 120 periodically, such as when information on phone 116 or phone system 120 changes.

For example, by sharing information between mobile device 102 and phone system 120, a user can access a list of calls on the phone system 120 that were missed on the mobile device 102. In such a scenario, mobile device 102, or cellular network 106 would have an application that transmits information about missed calls to server 104. Server 104 would, in turn, transmit the missed call information to phone system 120.

In another example, a log of in-coming and out-going calls on the mobile device 102 can be shared with the phone system 120. In such a scenario, a user would see the list of in-coming and out-going calls of the mobile device 102 when the user uses phone system 120 and vice versa, In his example, the mobile device 102 copies or mergers the contents of its call list into a call list on the sever 104. The server 104, in turn shares this information with the phone system 120. This process can occur when a user is participating in an ongoing telephone call on either device or at a subsequent time. The call list on either device can therefore contain a list of recently called persons made by both devices. In alternate embodiments, the server 104 is not used and instead, mobile device 102 electronically communicates the information to phone system 120 with a wired connection, use of a dongle or via a connection between cellular network 106 and phone system 120.

In still another example, a user can select a contact from the list of contacts on the mobile device 102, or highlight a number from the cell phone's "missed call" or "dialed calls" "received call" list, then make the call via the phone system 120 instead of from the mobile device 102. Likewise, the user can select the same lists on the phone system 120 and have a desired phone number automatically called on the mobile device 102.

Mobile device 102 is coupled to a cellular network 106 in a wireless fashion. Cellular network 106 is a network responsible for delivering messages to and receiving messages from mobile devices. Cellular network 106 may include both wireless and wired components, however. For example, cellular network 160 may include a cellular tower that is linked to a wired telephone network. Typically, the cellular tower carries communication to and from mobile devices.

A user can further utilize a separate computing device, to access the information stored in the server 104. For example, the user could access a list of calls that were missed on the mobile device 102 and the phone system 120 by accessing server 104 with computing device. Computing device can be directly connected to server 104, via communications network 114, or any other type of communications link.

Figure 2:
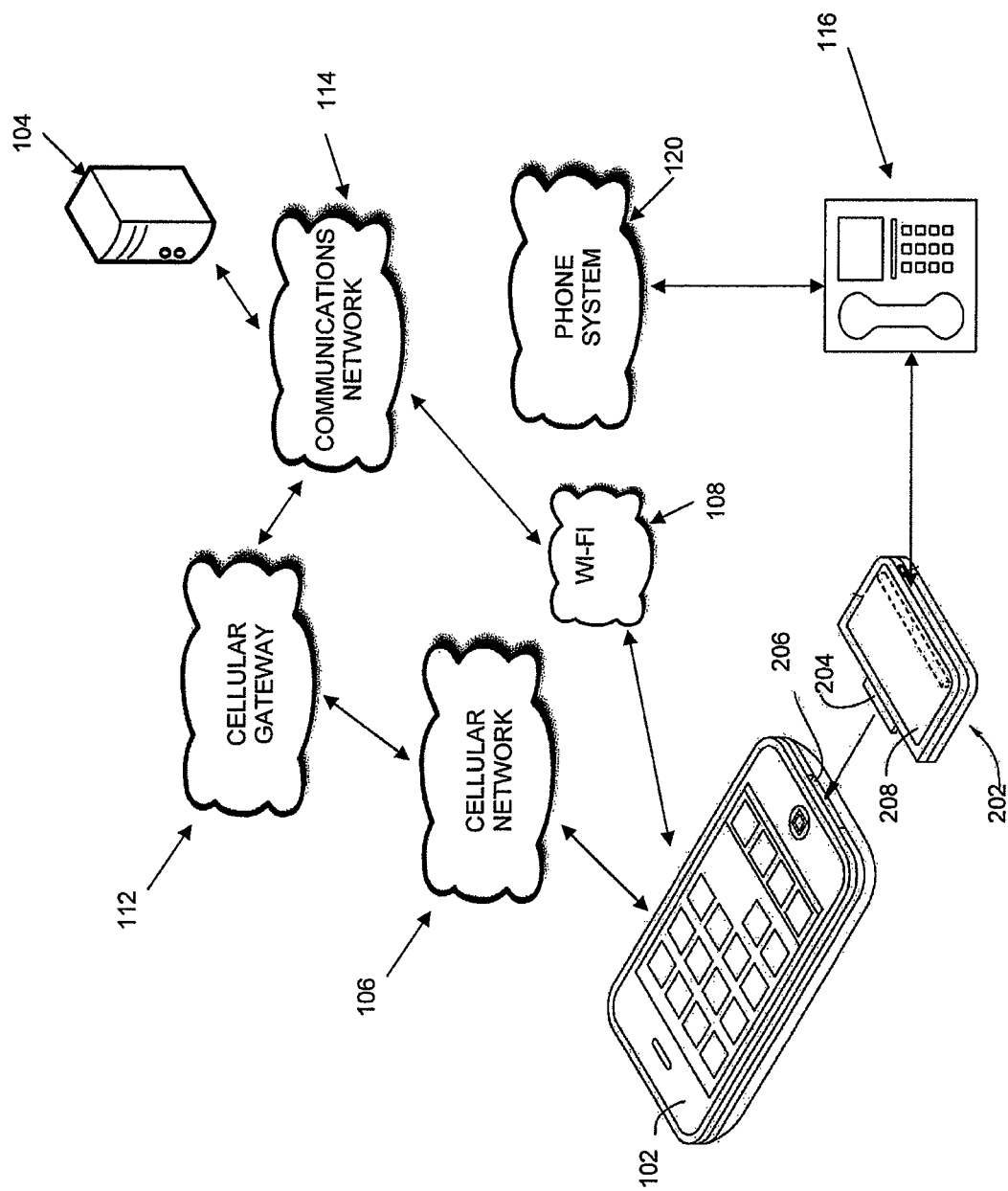
FIG. 2 illustrates another embodiment of the invention used within a communications system.

FIG. 2 illustrates another embodiment wherein the mobile device 102 is connected to phone 116 via a dongle 202. With the dongle 202, software is embedded in the mobile phone or embedded in the dongle 202 to facilitate the use of the mobile device 102 with the phone 116.

Dongle 202 comprises internal circuitry and software 208, and connector 204 that connects to a connector 206 on mobile device 102. The internal circuitry and software 208 performs auto-dialing functions on phone 116 as well as receives caller identification information for incoming calls on phone 116. Still further, with dongle 202, mobile device 102 can track outgoing calls placed on phone 116.

Dongle 202 can be wirelessly connected to a receiver on phone 116 or directly connected to phone 116 with, for example, interfacing with the RJ-11 jack on phone 116.

With dongle 202, a user can use the call log on mobile device 102 to place calls via the dongle 202 on phone 116. In addition, out-going calls placed on phone 116 and incoming calls received on phone 116 are stored on the call log in mobile device 102.

In certain embodiments, mobile device 102 provides the information obtained from phone 116 via dongle 202 to server 104 via the cellular network or via other wireless protocols such as link 108 which can be a WiFi link, cable communication link, or other links employing a variety of protocols such as the internet transport protocol. When the mobile device 102 sends the information to the server 104, via the link 108, the communications network 114 relays the information to server 104.

In another embodiment, the mobile device 102 provides the information to the server 104 via other types of wireless or wired links. For example, when the mobile device 102 can sends the information to the server 104, via the cellular network 106. When using the cellular network 106, a cellular gateway 112 is responsible for routing messages between cellular network 106 and a communications network 114. In one embodiment the communications network 114 is the internet; however, in other embodiments, the communications network 114 can by any type of network that communicates with server 104 such as a wide area network (WAN), local area network (LAN), or various other types of wired or wireless networks.

In one embodiment, the server 104 receives changes made to the information on the mobile device 102, or from a wireless link in the dongle 202. In other embodiments, the server requests the changes from the mobile device 102. These changes to the information are stored in the server 104 or some other attached storage device. The server 104 then sends these changes to phone 116.

When sending the information to phone 116, the server 104 transmits the information and/or the changes to the information to the phone 116 via a phone system gateway 118 and a phone system 120. The phone system gateway 118 is responsible for routing messages between the communications network 114 and the phone system 120.

Mobile device 102 is coupled to a cellular network 106 in a wireless fashion. Cellular network 106 is a network responsible for delivering messages to and receiving messages from mobile devices. Cellular network 106 may include both wireless and wired components, however. For example, cellular network 106 may include a cellular tower that is linked to a wired telephone network. Typically, the cellular tower carries communication to and from mobile devices.

Figure 3:
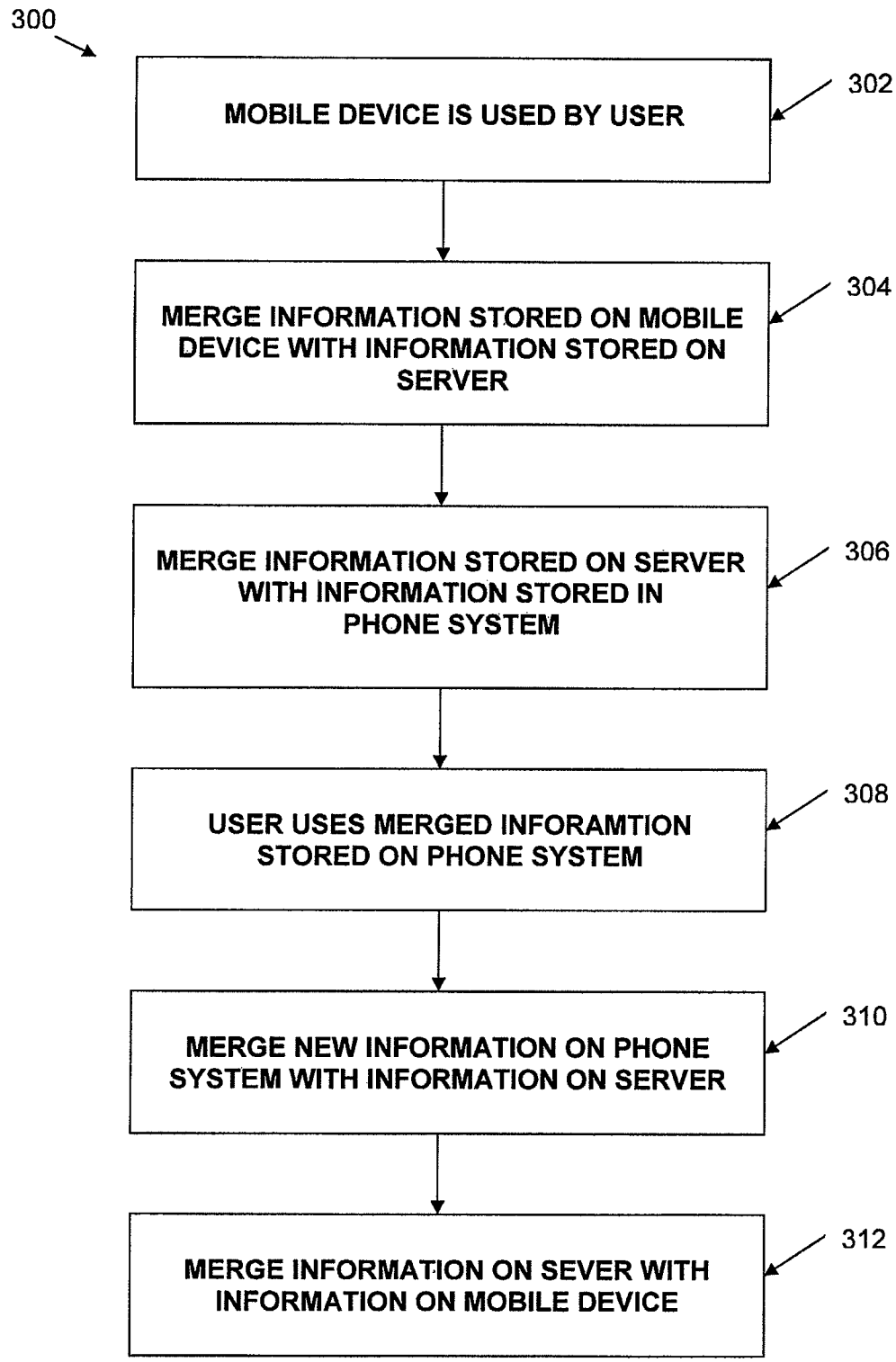
FIG. 3 illustrates a flow diagram of an embodiment of a process of sharing data with different communications devices.

FIG. 3 illustrates a process 300 of sharing information between mobile device 102 and phone system 120. In block 302, the mobile device 102 device can be used by a user as normal. Upon initialization, the log of in-coming and out-going calls, missed calls, text messages, address book information, GPS data, internet browsing data, and the like, in the mobile device 102 is transmitted to phone system 120 via the server 104, the communications network 114, the cellular network 106, the link 108, or the like.

In block 304, the mobile device 102 periodically sends changed data to the server 104. The periodic updates by the mobile device 102 can be on a scheduled basis as specified in a user-defined or administrator-defined setting. In another implementation, copying the information is initiated by the mobile device 102 periodically, when data changes on the mobile device 102 occur, or when a user initiates a feature of mobile device 102.

In yet another embodiment, the server 104 periodically requests changed data from the mobile device 102. The periodic requests by the server 104 can also be on a scheduled basis as specified in a user-defined or administrator-defined setting. Alternatively or additionally, the copying can be initiated by server 104 upon request from phone system 120.

In block 306, the server 104 then sends the information obtained from the mobile device 102 to the phone system 120. The data received from the server 104 by the phone system 120 is merged with the existing data on the phone system 120. In another embodiment, the server merges updated information with information obtained from the phone system 120 and sends the merged data to the phone system 120.

In block 308, the shared information is displayed on one or more of the devices. In one embodiment, the information from the mobile device 102 and the phone system 120 are merged together so that the user sees the information as if it originated on each device.

In yet another embodiment, the shared information is displayed separately or with an indication of the information source. For example, the phone system 120 displays its own information in a customary way, while indicating which information is from the mobile device 102. This can be done on one integrated user interface or by displaying the information separately.

In block 308, the user uses the shared information stored in the phone system 120. For example, the user of the phone system 120 views the shared data obtained from the mobile system 102 and uses the information to place a call, obtain contact information, browse to a desired webpage, view notes, or the link. For example, the user of the phone system 120 can view the calls occurring on the mobile device 102, and select one of the outgoing calls and thereby place a call on the phone system 120 using the phone number from the mobile device 102. In yet another embodiment, the user can select a phone number from the call log on the mobile device 102 and direct the phone system 120 to place the call.

In block 310, new information associated with use of the phone system 120 is then sent to the server 104. In certain embodiments, the server 104 periodically requests changed data from the phone system 120. The periodic requests by the server 104 can also be on a scheduled basis as specified in a user-defined or administrator-defined setting. Alternatively or additionally, the copying can be initiated by server 104 upon request from the mobile device 102. Still further, the sending of the changed data to the server can be initiated by the phone system 120.

In block 312, the server 104 then sends the information obtained from the phone system 120 to the mobile device 102. The data received from the server 104 by the mobile device 102 is merged with the existing data on the mobile device 102. In another embodiment, the server merges updated information with information obtained from the phone system 120 and sends the merged data to the mobile device 102.

Like on the phone system 120, the shared information on the mobile device 102 is displayed separately or with an indication of the information source. For example, the mobile device 102 displays its own information in a customary way, while indicating which information is from the phone system 120. This can be done on one integrated user interface or by displaying the information separately. For example, the user of the mobile device 102 can view the calls occurring on the phone system 120, and select one of the calls and thereby place a call on the mobile device 102 using the phone number from the phone system 120. In yet another embodiment, the user can select a phone number from the call log on the phone system 120 and direct the mobile device 102 to place the call.

While certain embodiments have been described with respect to server 104, in other embodiments, server 104 is not needed. Instead, mobile device 102 and phone system 120 share information via cellular network 106, cellular gateway 112, phone system gateway 118 or phone system 120 without storage of data on server 104. This is accomplished with electronic communications that occur between mobile device 102 and phone system 120 wherein the information is merged by each device.

Figure 4:
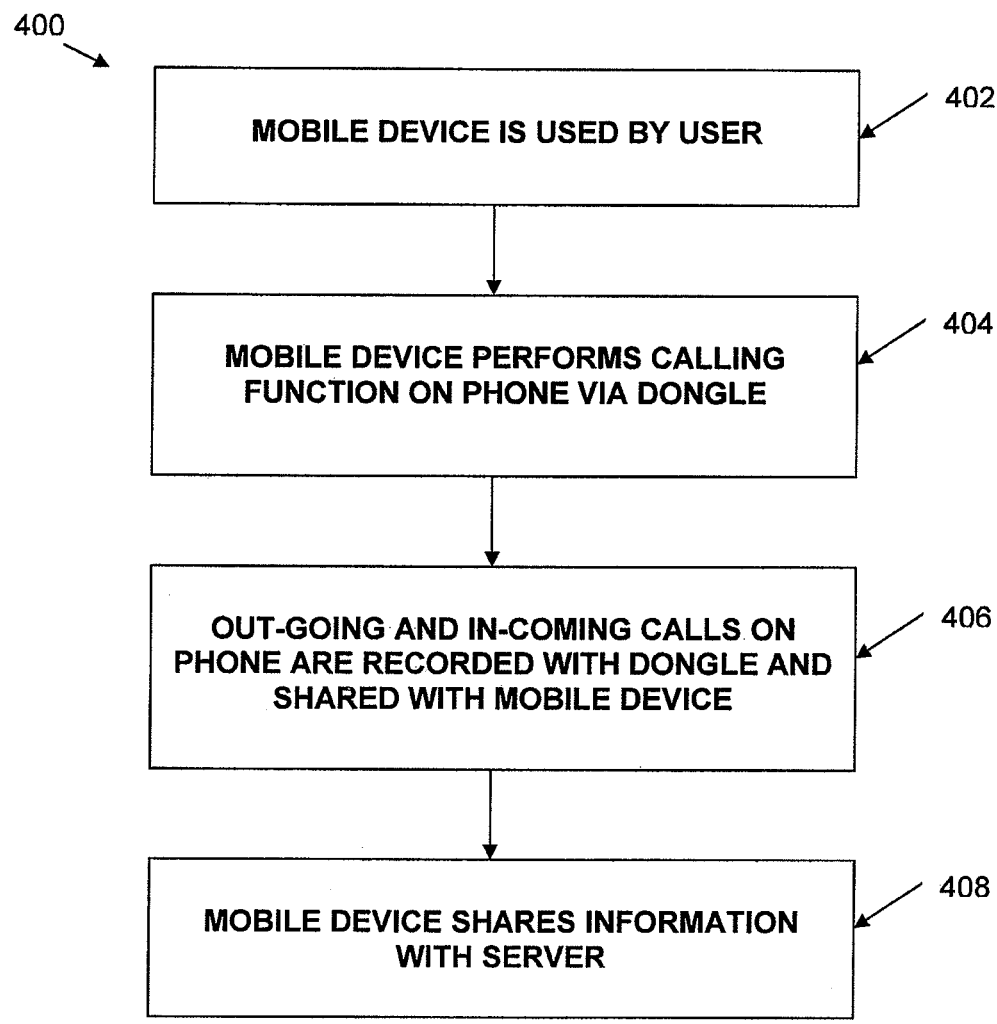
FIG. 4 illustrates a flow diagram of an embodiment of a process of sharing information on a mobile device with a legacy phone system.

FIG. 4 illustrates a process 300 of sharing information between mobile device 102 and a legacy phone system 120. In block 402, the mobile device 102 device can be used by a user as normal.

In block 402, the user connects mobile device 102 to dongle 202. Dongle 202 is in turn connected to phone 116. Using software installed on mobile device 102 or in dongle 202, a user initiates a call with mobile device 102. The call is then routed via dongle 202 to phone 116. In one embodiment, dongle 202 acts like an auto-dialer that initiates the call on phone 116.

In block 406, in one embodiment, dongle 202 receives caller identification information for incoming calls on phone 116. Still further, with dongle 202, mobile device 102 can track outgoing calls placed on phone 116.

Dongle 202 can be wirelessly connected to a receiver on phone 116 or directly connected to phone 116 with, for example, interfacing with the RJ-11 jack on phone 116.

With dongle 202, a user can use the call log on mobile device 102 to place calls via the dongle 202 on phone 116. In addition, out-going calls placed on phone 116 and incoming calls received on phone 116 are stored on the call log in mobile device 102.

In block 408, mobile device 102 can share the information collected from phone 116 with server 104. The mobile device 102 provides the information to the server 104 via the cellular network 106 and cellular gateway 112 or via other types of wireless or wired links 108.

The systems and methods described herein may be implemented as electronic hardware, computer software, or combinations of both. For example the systems and methods may be implemented or performed by a machine, such as a computer, a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A processor may be a microprocessor, a controller, microcontroller, state machine, combinations of the same, or the like. A processor may also be implemented as a combination of computing devices, e.g., a combination of a DSP and a microprocessor, a plurality of microprocessors or processor cores, one or more graphics or stream processors, one or more microprocessors in conjunction with a DSP, or any other such configuration.

The steps of or states of the processes may be embodied directly in hardware, in a software module executed by a processor, or in a combination of the two. For example, each of the processes described above may also be embodied in, and fully automated by, software modules executed by one or more machines such as computers or computer processors. A module may reside in a computer-readable storage medium such as RAM memory, flash memory, ROM memory, EPROM memory, EEPROM memory, registers, hard disk, a removable disk, a CD-ROM, memory capable of storing firmware, or any other form of computer-readable storage medium known in the art. An exemplary computer-readable storage medium can be coupled to a processor such that the processor can read information from, and write information to, the computer-readable storage medium. In the alternative, the computer-readable storage medium may be integral to the processor. The processor and the computer-readable storage medium may reside in an ASIC.

Depending on the embodiment, certain acts, events, or functions of any of the processes or algorithms described herein can be performed in a different sequence, may be added, merged, or left out all together. Thus, in certain embodiments, not all described acts or events are necessary for the practice of the processes. Moreover, in certain embodiments, acts or events may be performed concurrently, e.g., through multi-threaded processing, interrupt processing, or via multiple processors or processor cores, rather than sequentially.

Conditional language used herein, such as, among others, "can," "could," "might," "may," "e.g.," and from the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the logical blocks, modules, and processes illustrated may be made without departing from the spirit of the disclosure. As will be recognized, certain embodiments of the inventions described herein may be embodied within a form that does not provide all of the features and benefits set forth herein, as some features may be used or practiced separately from others.

What is claimed is:

1. A method of synchronizing data in different devices comprising:
    connecting a dongle to a landline telephone, the dongle stores first call usage information associated with the landline telephone, the first call usage information comprising at least identification information for outgoing calls placed on the landline telephone;
    connecting the dongle to a cellular phone and storing in the dongle, second call usage information associated with the cellular phone, the second call usage information comprising at least identification information for outgoing calls placed on the cellular phone;
    displaying on the cellular phone the first and second call usage information stored on the dangle; and
    initiating a call on the landline telephone using either the first call usage information stored on the dongle, or the second call usage information stored on the dongle.

2. The method of claim 1 further comprising initiating a call on the cellular telephone using either the first call usage information stored on the dangle, or the second call usage information stored on the dongle.

3. The method of claim 1 wherein the first call usage information associated with the landline telephone is merged with the second call usage information associated with the cellular phone.

4. A method of synchronizing data in different devices comprising:
- connecting a dongle to a landline telephone, the dongle stores first call usage information associated with the landline telephone, the first call usage information comprising at least identification information for outgoing calls placed on the landline telephone;
- connecting the dongle to a cellular phone and storing in the dongle, second call usage information associated with the cellular phone, the second call usage information comprising at least identification information for outgoing calls placed on the cellular phone;
- displaying on the cellular phone the first and second call usage information stored on the dongle; and
- wherein the cellular phone initiates a call on the landline telephone via the dangle.

5. The method of claim 4 wherein the dongle provides the first and second call usage information to a server.

6. The method of claim 5 wherein the server merges a call log associated with the cellular phone with a call log associated with the landline telephone.

7. The method of claim 5 wherein the landline phone accesses the first and second call usage information via the server.

8. The method of claim 5 wherein the cellular phone accesses the first and second call usage information via the server.

9. The method of claim 5 wherein the server receives third call usage information from an additional source.

10. An apparatus of synchronizing data in different devices comprising:
- a dongle that is configured to connect to a landline telephone and store first call usage information associated with the landline telephone, the first call usage information comprising at least identification information for outgoing calls placed on the landline telephone,
- the dongle is further configured to connect to a cellular phone and store second call usage information associated with the cellular phone, the second call usage information comprising at least identification information for outgoing calls placed on the cellular phone;
- wherein the dongle has software embedded therein that enables the display of the first and second call usage information on the cellular phone; and
- initiation of a call on the landline telephone using either the first call usage information stored on the dongle, or the second call usage information stored on the dongle.

11. The apparatus of claim 10 further comprising initiation of a call on the cellular telephone using either the first call usage information stored on the dongle, or the second call usage information stored on the dongle.

12. The apparatus of claim 10 wherein the first call usage information associated with the landline telephone is merged with the second call usage information associated with the cellular phone.

13. An apparatus of synchronizing data in different devices comprising:
- a dongle that is configured to connect to a landline telephone and store first call usage information associated with the landline telephone, the first call usage information comprising at least identification information for outgoing calls placed on the landline telephone,
- the dongle is further configured to connect to a cellular phone and store second call usage information associated with the cellular phone, the second call usage information comprising at least identification information for outgoing calls placed on the cellular phone;
- wherein the dongle has software embedded therein that enables the display of the first and second call usage information on the cellular phone; and
- wherein the cellular phone initiates a call on the landline telephone via the dongle.

14. The apparatus of claim 13 wherein the dangle provides the first and second call usage information to a server.

15. The apparatus of claim 14 wherein the server merges a call log associated with the cellular phone with a call log associated with the landline telephone.

16. The apparatus of claim 14 wherein the landline phone accesses the first and second call usage information via the server.

17. The apparatus of claim 14 wherein the cellular phone accesses the first and second call usage information via the server.

18. The apparatus of claim 14 wherein the server receives third call usage information from an additional source.

* * * * *